United States Patent [19]

Nakayama et al.

[11] Patent Number: 4,734,810
[45] Date of Patent: Mar. 29, 1988

[54] MAGNETIC RECORDING MEDIUM COMPRISING PROTRUSION ON ITS SURFACE AND A PLASMA TREATED SUBSTRATE AND RECORDING/REPRODUCING METHOD THEREFOR

[75] Inventors: Masatoshi Nakayama; Kunihiro Ueda; Yuichi Kubota, all of Tokyo, Japan

[73] Assignee: TDK Corporation, Tokyo, Japan

[21] Appl. No.: 758,436

[22] Filed: Jul. 24, 1985

[30] Foreign Application Priority Data

Aug. 2, 1984 [JP] Japan ................. 59-163249

[51] Int. Cl.⁴ .............. G11B 5/62; G11B 5/712; G11B 5/78; G11B 5/82
[52] U.S. Cl. ................... 360/131; 360/134; 360/135
[58] Field of Search ............... 360/131–136

[56] References Cited

U.S. PATENT DOCUMENTS 4,575,475  3/1986  Nakayama et al. ................. 428/480
4,578,729  3/1986  Suzuki et al. .................. 360/134

FOREIGN PATENT DOCUMENTS 53-116115  10/1978  Japan .
57-42889   9/1982   Japan .
58-68227   4/1983   Japan .
58-77030   5/1983   Japan .
58-100221  6/1983   Japan .

Primary Examiner—Robert S. Tupper
Attorney, Agent, or Firm—Oblon, Fisher, Spivak, McClelland & Maier

[57] ABSTRACT

A magnetic recording medium comprising a ferromagnetic metal thin film layer formed on one surface of a flexible non-magnetic substrate and primarily comprising cobalt and oxygen is improved in durability by treating the substrate with a plasma at a frequency of 10 kHz to 200 kHz, and providing the magnetic layer on the surface with protrusions having a height of 30 to 300 Å at an average density of at least $10^5/a^2$ per square millimeter of the surface, provided that the magnetic recording medium is passed for recording/reproducing operation across a magnetic head with a gap having a distance a as expressed n μm.

11 Claims, 5 Drawing Figures

MAGNETIC RECORDING MEDIUM COMPRISING PROTRUSION ON ITS SURFACE AND A PLASMA TREATED SUBSTRATE AND RECORDING/REPRODUCING METHOD THEREFOR

BACKGROUND OF THE INVENTION

This invention relates to magnetic recording media, and more particularly, to magnetic recording media of metal thin film type, and a method for conducting recording/reproducing operation in such media.

Among magnetic recording media for use in video, audio and other applications, active research and development works have been made on magnetic recording media, usually magnetic tapes having a magnetic layer in the form of a continuous thin film because of the compactness of a roll of tape.

The preferred magnetic layers for such continuous metal film type media are deposited films of Co, Co-Ni, Co-O, Co-Ni-O and similar systems formed by the so-called oblique incidence evaporation process in which cobalt and optional elements are evaporated in vacuum and directed at a given angle with respect to the normal to the substrate because such evaporated films exhibit superior characteristics.

These magnetic recording media, particularly for use as magnetic tape and magnetic discs, must fulfil a number of requirements including low dynamic coefficient of friction, smooth and stable travel performance for a prolonged period, improved wear resistance, stability under storage environment to ensure consistent reproduction, and durability (durability of tape both during normal operation and in the still mode).

A variety of pre-treatments have heretofore been made on various base films or substrates for the purpose of improving durability. Such pre-treatments include treatments with chemical solution, coating, corona discharge treatment, and the like.

Chemical treatments may be treatments with acid and alkali. Among such chemical treatments most effective is by oxidizing the surface of a base film with a chemical solution of a strong acid and/or a strong oxidizing agent, for example, chromate solution, and introducing carbonyl or carboxyl radicals to etch the surface. The chemical treatments, however, require subsequent rinsing and drying of film surface and a great investment is needed for the treatment of spent liquid. Particularly, chromate treatment yields a spent liquid which must be severely treated for environmental pollution control, and its commercial utilization is now diminishing.

The film coating technique is by coating a base film with an undercoat on which a magnetic film is formed. The interaction between a binder in the undercoat and the magnetic film is necessary. The composition of the undercoat must be selected to meet a particular binder and pigment used in the magnetic layer. The coating techniques reguire not only such a careful choice, but also coating and drying steps. Of course, the consumption of coating material leads to the increased cost of products.

The corona discharge treatment is advantageous because of dry nature eliminating the need for additional steps of rinsing, drying, and disposal of spent liquid. Corona treatment has been carried out for many years and is effective in improving adhesion, wettability, and printability. The corona treatment, however, is not successful in improving the properties of magnetic recording media to such an extent as to fulfill the high performance which is imposed on the present day and future magnetic recording media.

Another technique known in the art is a flame treatment which is difficult to apply to magnetic recording media which reguire a high degree of dimensional stability.

Under these circumstances, a proposal is made to treat base films or substrates with a plasma. The plasma treatment is a one-step dry process and thus has the advantage that drying and disposal of spent solution are unnecessary and no extra material like binders is consumed. In addition, the plasma treatment enables high speed, continuous production so that it can be readily incorporated in the process of manufacturing magnetic recording media without sacrifying production speed and yield.

One technique for plasma treatment of substrates is disclosed in Japanese Patent Publication No. 57-42889 (published on Sept. 11, 1982) wherein a treatment is effected with a plasma having a frequency in the range of radio frequency to microwave using a treating gas of air, oxygen, nitrogen, hydrogen, helium, argon, etc. The radio frequency of 13.56 MHz is only described in this publication.

Also, Japanese Patent Application Kokai No. 58-77030 (laid open on May 10, 1983) descloses a process of plasma treatment by applying an AC current at the commercial frequency between electrodes using a treating gas of oxygen, argon, helium, neon or nitrogen. These plasma treatments are somewhat successful in improving the adhesion of a treated base film to a magnetic layer and hence, the durability of magnetic recording media, but not fully satisfactory in bond strength and durability.

These media should have a flat surface because of remarkable deterioration of their properties due to a spacing loss. However, as the surface becomes flatter, the friction becomes greater adversely affecting head contact and transport movement.

Usually, the metal thin film type media have a magnetic layer as thin as 0.05 to 0.5 $\mu$m so that the surface property of the media depends on the surface property of the substrate. For example, Japanese Patent Application Kokai No. 53-116115 discloses the provision of gently sloping protrusions in the form of creases or wrinkles on the substrate surface. Also, Japanese Patent Application Kokai Nos. 58-68227 and 58-100221 disclose the location of fine particles on the substrate surface, resulting in surface irregularities observable under an optical microscope with a magnifying power of 50 to 400 and actually measureable for height by means of a probe surface roughness meter (height 100 to 2000 Å). These media are improved to a more or less extent in physical properties such as dynamic friction, runnability (the durability of tape which travels in firctional contact with rigid members in a recording machine), and moving stability as well as in electromagnetic properties.

Various physical and electromagnetic properties of the ferromagnetic metal thin film layer can be further improved when the magnetic layer contains oxygen, and particularly when an oxide coating of ferromagnetic metal (Co and/or Ni) is formed at the magnetic layer surface, for example, by carrying out the formation of the ferromagnetic thin film layer in the presence of oxygen under a predetermined partial pressure. The above-mentioned gently sloping protrusions in the form of creases or wrinkles are less effective particularly when the oxide coating is formed at the magnetic layer surface.

In Japanese Patent Application Kokai No. 58-68227, fine protrusions are distributed at a density of at most about $10^6$ per square millimeter. Video tape recorders utilize the minimum recording wavelength of less than 1 $\mu$m, for example, about 0.7 $\mu$m. The magnetic layer having an oxide coating on its surface provides insufficient physical and electromagnetic properties at such a recording wavelength.

Japanese Patent Application Kokai No. 58-100221 describes Examples 1 and 2 where fine protrusions having a height of 300 to 500 Å are distributed at a density of about $10^4$ to $10^6$ per square millimeter. These magnetic layers are regarded to be free of oxide at the surface and thus exhibit different travel durability behavior than magnetic layers having an oxide coating at the surface. The presence of an oxide layer on the magnetic layer surface requires that fine protrusions be distributed in optimum correlated size and density. Differently stated, prior art metal thin film type magnetic media are still not satisfactorily improved in durability, bond strength, and physical and electromagnetic properties.

SUMMARY OF THE INVENTION

It is, therefore, an object of the present invention to provide a novel and improved metal thin film type magnetic recording medium having a flexible substrate plasma treated so as to substantially improve durability and bond strength of the magnetic layer.

It is another object of the present invention to provide a magnetic recording medium of such type having fine protrusions distributed in such size and population as to provide optimum physical and electromagnetic properties.

It is a further object of the present invention to provide a method for conducting recording/reproducing operation on such a magnetic recording medium.

According to a first aspect of the present invention, there is provided a magnetic recording medium comprising a flexible substrate having opposed major surfaces, and a ferromagnetic metal thin film layer on one surface of the substrate primarily comprising cobalt. The magnetic recording medium is used in combination with a magnetic head having a gap. According to the feature of the present invention, the substrate is plasma treated at a frequency in the range of 10 to 200 kilohertz. The metal thin film layer contains oxygen. Protrusions having a height of 30 to 300 Å are distributed on the surface of the magnetic recording medium at an average density or population of at least $10^5/a^2$ per square millimeter of the surface where a is the distance of the magnetic head gap as expressed in $\mu$m.

According to a second aspect of the present invention, there is provided a method for conducting recording/reproducing operation on a magnetic recording medium comprising a flexible substrate having opposed major surfaces, and a ferromagnetic metal thin film layer on one surface of the substrate principally comprising cobalt, by passing the medium across a magnetic head having a gap. The feature of the present invention is that the ferromagnetic metal thin film layer contains oxygen and is formed on the flexible substrate which has been plasma treated at a frequency in the range of 10 to 200 kilohertz, and the medium has in average at least $10^5/a^2$ protrusions per square millimeter of the surface, the protrusions having a height of 30 to 300 Å, where a is the distance of the magnetic head gap as expressed in $\mu$m.

BRIEF DESCRIPTION OF THE DRAWINGS

The above and other objects, features, and advantages of the present invention will be more fully understood by reading the following description when taken in conjunction with the accompanying drawings, in which.

It should be noted that the drawings are not drawn to scale and the components are disproportionately depicted for purposes of illustration.

DETAILED DESCRIPTION OF THE INVENTION

Figure 1:
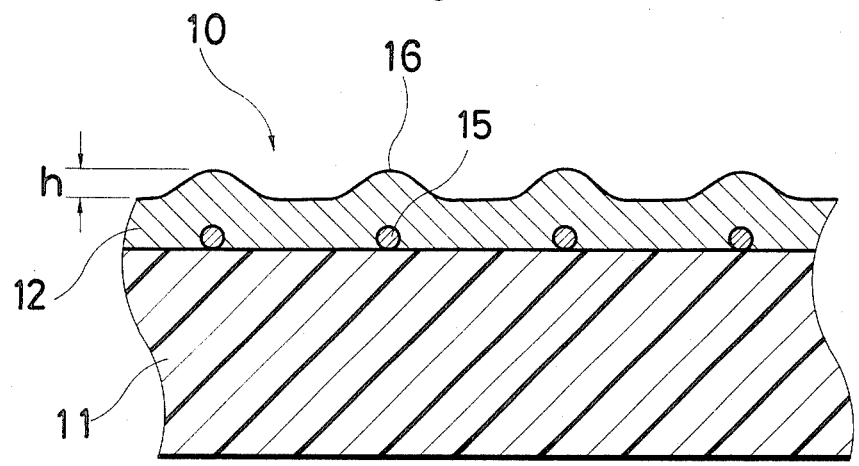
FIG. 1 is a cross-sectional view of a magnetic recording medium according to one embodiment of the present invention.

Referring to FIG. 1, there is illustrated a magnetic recording medium generally designated at 10 according to the present invention. The magnetic recording medium 10 includes a flexible substrate 11 having opposed major surfaces and a ferromagnetic metal thin film layer 12 formed on one major surface of substrate 11. The medium 10 has randomly distributed protrusions or bosses 16 on the surface, preferably on the magnetic layer surface. It is also contemplated in the present invention that a topcoat layer of any well-known composition is formed on the surface of metal thin film layer 12 and a backcoat layer of any well-known composition is formed on the other major surface of substrate 11, although the topcoat and backcoat layers are not shown in the figure and not critical to the present invention.

These elements will be described in more detail hereinafter.

Substrate

The flexible substrates on which the ferromagnetic metal thin film layer is formed are not particularly limited as long as they are non-magnetic. Particularly preferred are flexible substrates, especially, of resins, for example, polyesters such as polyethylene terephthalate and polyimides. The substrates are not particularly limited in shape, size and thickness as long as they meet the intended application. Preferably, the substrates to be plasma treated according to the present invention have a thickness of about 5 to 20 μm.

Protrusion

Fine protrusions or bosses 16 as shown in FIG. 1 have a height h of 30 to 300 Å, and more particularly, 50 to 250 Å. The protrusions provided in the present invention have such dimensions that they are not observable under an optical microscope or measureable by a probe type surface roughness meter, but can only be observable under a scanning electron microscope. Larger protrusions in excess of 300 Å which are observable under an optical microscope are not desirable because of deterioration in electromagnetic properties and movement stability. Smaller protrusions of lower than 30 Å are not effective in improving physical properties.

Figure 2:
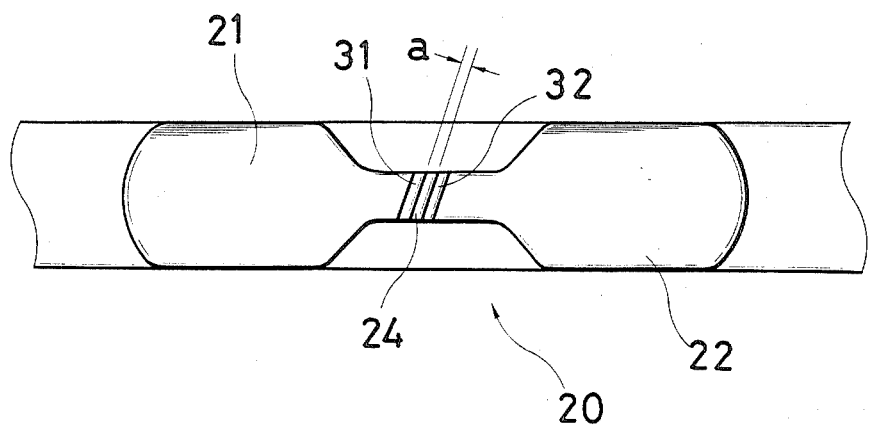
FIG. 2 is an elevation of one example of a magnetic head used in the method of the present invention.

The protrusions should be distributed on the surface of the magnetic recording medium at an average density of at least $10^5/a^2$, and more preferably $2 \times 10^6/a^2$ to $1 \times 10^9/a^2$ per square millimeter of the surface. A magnetic head 20 with which the magnetic recording medium of the present invention is used is provided with a gap 24 having a distance a (as expressed in μm) as shown in FIG. 2. The gap distance a usually ranges from 0.1 μm to 0.5 μm, and more preferably, from 0.1 μm to 0.4 μm. At protrusion densities of less than $10^5/a^2/mm^2$, and more particularly less than $2 \times 10^6/a^2/mm^2$, there result increased noise, deteriorated still performance, and other disadvantages, which are undesirable in practical applications. Higher protrusion densities of more than $10^9/a^2/mm^2$ are rather less effective in improving physical properties.

The protrusions 16 may generally be provided by placing submicron particles 15 on the surface of the substrate as clearly shown in FIG. 1. The submicron particles used herein have a particle size of 30 to 300 Å, and more preferably 50 to 250 Å. Submicron protrusions are then formed on the surface of the magnetic recording medium which conform to the submicron particles on the substrate surface in shape and size.

The submicron particles used in the practice of the present invention are those generally known as colloidal particles. Examples of the particles which can be used herein include $SiO_2$ (colloidal silica), $Al_2O_3$ (alumina sol), MgO, $TiO_2$, ZnO, $Fe_2O_3$, zirconia, CdO, NiO, $CaWO_4$, $CaCO_3$, $BaCO_3$, $CoCO_3$, $BaTiO_3$, Ti (titanium black), Au, Ag, Cu, Ni, Fe, various hydrosols, and resinous particles. Inorganic particles are preferred among others.

The submicron particles may be placed on the substrate surface, for example, by dispersing them in a suitable solvent to form a dispersion, and applying the dispersion to the substrate followed by drying. Any aqueous emulsion containing a resinous component may also be added to the particle dispersion before it is applied to the substrate. The addition of a resinous component allows gently-sloping protrusions to form in conformity to the particles although it is not critical in the present invention.

Plasma Treatment

According to the present invention, substrates or base films are plasma treated on at least one surface which is to bear a magnetic layer. Although the substrate may be directly treated with plasma, it is preferable to apply the above-mentioned particle dispersion on the substrate surface prior to the plasma treatment.

The plasma treatment is effected by feeding an inorganic gas as the treating gas, ionizing it, and contacting the gas-discharge plasma with the substrate, thereby plasma treating the substrate surface.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissodiate further atoms and molecules. This chain reaction causes the gas to be instantaneously converted into highly ionized state. This is generally called a plasma. Since gaseous molecules have a less chance of collision with electrons and little absorb energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of chemical reaction such as polymerization while being kept relatively unchanged from the original. Substrates are plasma treated under these conditions according to the present invention. The use of a low temperature plasma avoids any thermal influence on substrates.

Figure 3:
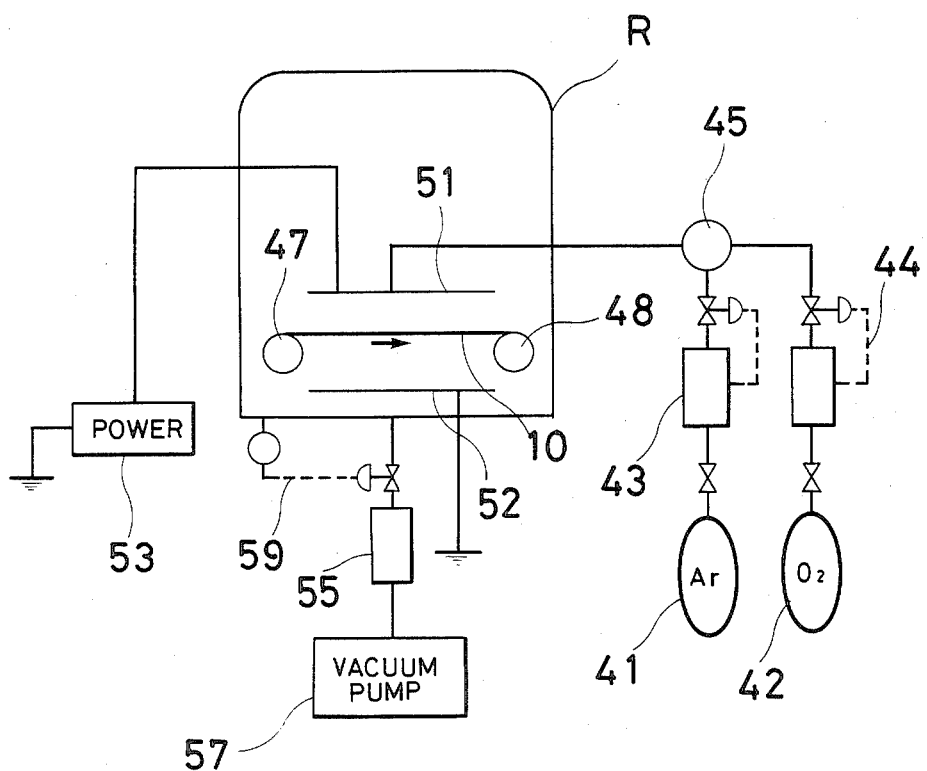
FIG. 3 is a schematic illustration of a plasma treating apparatus having a variable frequency power source.

FIG. 3 illustrates a typical apparatus in which substrates on the surface thereof are treated with a plasma. This plasma apparatus uses a variable frequency power source. The apparatus comprises a reactor vessel R into which a treating gas(es) is introduced from a source 41 and/or 42 through a mass flow controller 43 and/or 44. When desired, different gases from the sources 41 and 42 may be mixed in a mixer 45 to introduce a gas mixture into the reactor vessel. The treating gases may be fed at a flow rate of 1 to 250 ml per minute.

Disposed in the reactor vessel R is means for supporting a base film to be treated, that is, a flexible substrate having particles distributed thereon. The support means used in this embodiment is a set of supply and take-up rolls 47 and 48 on which a substrate 10 for ordinary magnetic tape is wound. Depending on the particular shape of the magnetic recording medium substrate to be treated, any desired supporting means may be used, for example, a rotary support apparatus on which the substrate rests.

On the opposed sides of the substrate to be treated are located a pair of electrodes 51 and 52, one electrode 51 being connected to a variable frequency power source 53 and the other electrode 52 being grounded.

The reactor vessel R is further connected to a vacuum system for evacuating the vessel, including a liquefied nitrogen trap 55, a vacuum pump 57, and a vacuum controller 59. The vacuum system has the capacity of evacuating and keeping the reactor vessel R at a vacuum of 0.01 to 10 Torr.

In operation, the reactor vessel R is first evacuated by means of the vacuum pump 57 to a vacuum of $10^{-3}$ Torr or lower before a treating gas or gases are fed into the vessel at a given flow rate. Then the interior of the reactor vessel is maintained at a vacuum of 0.01 to 10 Torr. A take-up roll motor (not shown) is turned on to transfer the substrate to be treated. When the rate of transfer of the substrate and the flow rate of the treating gas mixture become constant, the variable frequency power 53 is turned on to generate a plasma with which a travelling substrate is treated.

In this plasma treatment, the power source must have a frequency in the range of 10 to 200 kilohertz. Frequencies lower than 10 KHz and higher than 200 KHz result in a reduction in bond strength, and hence, durability imparted to magnetic recording media. It is to be noted that other parameters including supply current and treating time may be as usual or properly selected through experimentation.

In the preferred embodiment of the invention, an inorganic gas containing oxygen is used as the treating gas. The inorganic gas may contain an effective proportion of, preferably 5 to 100% by volume of oxygen. The inorganic gas may be oxygen alone. As the inorganic gas mention may be made of argon, neon, helium, nitrogen, hydrogen and mixtures of two or more of them. It is also contemplated to use air as the oxygen-containing inorganic gas.

Magnetic Layer

The magnetic recording medium of the present invention has a magnetic layer on a substrate. The magnetic layer is of continuous ferromagnetic metal thin film type coextending over the substrate and is generally based on cobalt. In preferred embodiments of the present invention, the magnetic layer may preferably consist essentially of cobalt; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

The magnetic layer may further contain oxygen in addition to cobalt or cobalt and nickel. The presence of oxygen contributes to further improvements in electromagnetic characteristics and runnability. In this case, the atomic ratio of O/Co (when nickel free) or O/(Co+Ni) is preferably not more than about 0.5, and more preferably from about 0.05 to 0.5.

Better results are obtained when the ferromagnetic metal thin film layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co+Ni) is preferably in the range of about 0.001 to 0.1, and more preferably about 0.005 to 0.05.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition metal elements, for example, Fe, Mn, V, Zr, Nb, Ta, Ti, Zn, Mo, W, Cu, etc.

The ferromagnetic metal thin film layer preferably consists of a coalescence of Co base particles of columnar structure oriented oblique to the normal to the substrate. More specifically, the axis of particles of columnar structure is preferably oriented at an angle of about 10 to 70 degrees with respect to the normal to the major surface of the substrate. Each columnar particle generally extends throughout the thickness of the thin film layer and has a minor diameter of the order of 50 to 500 angstroms. Cobalt and optional metals such as nickel and chromium form the columnar structure particles themselves while oxygen, when added, is generally present on the surface of each columnar structure particle in the surface layer essentially in the form of oxides. The ferromagnetic metal thin film layer generally has a thickness of about 0.05 to 0.5 $\mu$m, and preferably about 0.07 to 0.3 $\mu$m.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process reference should be made to D. E. Speliotis et al., "Hard magnetic films of iron, cobalt and nickel", *J. Appl. Phys.*, 36, 3, 972 (1965) and Y. Maezawa et al., "Metal thin film video tape by vacuum deposition", IERE Conference Proceedings 54 (The Fourth International Conference on Video and Data Recording, The University of Southanmpton, Hampshire, England, 20-23 Apr., 1982), pp. 1-9.

The ferromagnetic metal thin film layer may be formed on the substrate either directly or via an undercoat layer of the well-known type. Further, the ferromagnetic metal thin film layer is genrally formed as a single layer, but in some cases, it may be made up from a plurality of laminated sub-layers with or without an intermediate non-ferromagnetic metal thin film layer interposed therebetween.

The ferromagnetic metal thin film layer may be formed by any well-known techniques including evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inner atmosphere of argon, helium or vacuum containing oxygen gas at a pressure of about $10^{-5}$ to $10^0$ Pa. Those skilled in the art will readily select other evaporation parameters including source-substrate spacing, substrate feed direction, can and mask configurations and arrangement, and the like, through a simple experiment if necessary.

Evaporation in an oxygen-containing atmosphere causes a metal oxide film to form on the surface of the resulting magnetic layer. The partial pressure of oxygen gas necessary to allow for oxide formation may be readily determined through a simple experiment.

A metal oxide coating may be formed on the surface of the magnetic layer by an oxidizing treatment. Any of the following oxidizing treatments may be employed for this purpose.

(1) Dry treatment (a) Energy particle treatment

Oxygen may be directed as energy particles to the magnetic layer at the final stage of evaporation process by means of an ion gun or neutron gun as described in Noguchi et al, U.S. Ser. No. 603,894 assigned to the same assignee as the present invention.

(b) Glow treatment

The magnetic layer is exposed to a plasma which is created by generating a glow discharge in an atmosphere containing $O_2$, $H_2O$ or $O_2+H_2O$ in combination with an inert gas such as Ar and $N_2$.

(c) Oxidizing gas

An oxidizing gas such as ozone and heated steam is blown to the magnetic layer.

(d) Heat treatment

Oxidation is effected by heating at temperatures of about 60 to 150° C.

(2) Wet Treatment (a) Anodization (b) Alkali treatment (c) Acid treatment

Chromate treatment, permanganate treatment, phosphate treatment (d) Oxidant treatment $H_2O_2$

Magnetic Head

The magnetic recording medium of the present invention may be operated in combination with a variety of magnetic heads. It is preferred that at least a gap-defining edge portion of the magnetic head be of a ferromagnetic metal material. It is possible to form a core entirely of a ferromagnetic metal material although a part of the core including a gap-defining edge portion may be formed of a ferromagnetic metal material.

FIG. 2 schematically shows a magnetic head generally designated at 20 as comprising core halves 21 and 22 formed of a ferromagnetic material such as ferrite. The core halves 21 and 22 are metallized at their gap-defining edge portions with ferromagnetic metal material layers 31 and 32 of about 1 to 5 μm thick by sputtering or any suitable metallizing techniques. The core halves 21 and 22 are mated so as to define a gap 24 therebetween which is filled with glass or dielectric material and has a distance a. This configuration, although the figure is not drawn to exact proportion and shape, provides improved electromagnetic properties and ensures smooth tape passage thereacross without head adhesion or clogging. Of course, the shape and structure of the head is well known.

In the practice of the present invention, it is desirable that the head gap 24 has a distance a of 0.1 to 0.5 μm, and preferably 0.1 to 0.4 μm, and a track width of 10 to 50 μm, and preferably 10 to 20 μm.

The ferromagnetic metal materials used in the fabrication of the magnetic head may be selected from a variety of such materials including thin films and thin plates of amorphous magnetic metals, Sendust, hard Permalloy, Permalloy, etc. Among them, particularly preferred are amorphous magnetic Co-based alloys because they experience little head adhesion or clogging and have excellent electromagnetic properties. Preferred are amorphous magnetic alloys comprising 70 to 95 atom % of Co and 5 to 20 atom % of a vitrifying element(s) such as Zr, Nb, Ta, Hf, rare earth elements, Si, B, P, C, Al, etc., with the Zr and/or Nb being most preferred. Also preferred are alloys comprising 65 to 85 atom % of Co and 15 to 35 atom % of Si and/or B as a vitrifying element. The latter alloys may further contain less than 10 atom % of Fe, less than 25 atom % of Ni, less than 20 atom % (in total) of at least one member of Cr, Ti, Ru, W, Mo, Ti, Mn, etc.

The amorphous magnetic alloys may be formed into core halves or gap-defining segments by sputtering or high speed quenching.

Recording/reproducing operation may be performed on the magnetic recording medium of the present invention by means of the above-mentioned magnetic head in accordance with any well-known video recording/reproducing systems including the so-called VHS, Beta, 8-mm video and U-standard systems.

The magnetic recording medium and recording/reproducing method according to the present invention has a number of benefits.

The magnetic recording medium exhibits sufficiently reduced dynamic friction to provide stable movement because protrusion as high as 30 to 300 Å are distributed on the magnetic layer surface at an average density of at least $10^5/a^2/mm^2$.

Since a controlled plasma treatment is carried out on the substrate at a frequency in the specified range in a treating gas having a controlled oxygen partial pressure, the bond strength between the substrate and the magnetic layer formed thereon with or without an intervening undercoat layer is significantly increased, resulting in improved durability.

Runnability is outstandingly improved so that the dynamic friction increases little after repeated travel cycles in a recording/reproducing equipment. The medium tolerates an increased number of recording/reproducing operations and offers improved still characteristics (characteristics in the still mode reproduction).

Improved stability ensures that the medium can be stored and operated in severely varying environments from high-temperature high-humidity to low-temperature low-humidity environments.

Reproduction output is little affected by a spacing loss and contains less noise.

The magnetic recording medium operated in contact with a head releases little materials which will adhere to and clog the head.

These benefits are further enhanced when the medium is used in combination with ferromagnetic metal heads, and particularly in the case of high density recording at a minimum recording wavelength of less than 1 μm.

EXAMPLES

Examples of the present invention are given below by way of illustration and not by way of limitation.

EXAMPLE 1

Colloidal silica was applied onto a substantially particulate-free smooth polyethylene terephthalate (PET) film of 10 μm thick. There was obtained a substrate having submicron particles or protrusions distributed thereon.

The particle-bearing substrate was plasma treated using argon and oxygen alone and mixtures of oxygen and argon as the treating gas. The plasma treating conditions were as follows.

Gas flow rate: 100 ml/min. fixed for all cases of Ar alone, $O_2$ alone and mixtures of Ar and $O_2$
Vacuum: 0.5 Torr
Frequency: 100 kHz
Power: 200 Watts
Substrate transfer speed: 30 m/minute It is to be noted that the RF and microwave plasma treatments used herein correspond to 13.56 MHz and 2.45 GHz, respectively.

The thus treated polyester substrate was moved along the circumferential surface of a cooled cylindrical can in a chamber which was evacuated to vacuum. A Co-Ni alloy was evaporated onto the substrate surface by heating with an electron beam gun while introducing oxygen into the evaporating atmosphere. The background pressure was set to $5 \times 10^{-5}$ Torr and changed to $2 \times 10^{-4}$ Torr after the introduction of $O_2$. The incident angle during evaporation was continuously reduced from 90° to 30°. The thus deposited layer has a composition of 80 Co/20 Ni (weight ratio) and a thickness of about 1500 Å.

For the samples prepared according to the present invention, no particular effect due to the application of colloidal silica was detected by observation under an optical microscope or by measurement with a probe-type surface roughness meter whereas protrusions were observed under a scanning electron microscope as being formed on the magnetic layer and having dimensions in conformity to the colloidal silica particles applied.

The height and density of protrusions on the magnetic layer are shown in Table 1 along with the properties.

Measurements are made as follows. The tests for evaluating electromagnetic properties used a signal having the minimum recording wavelength of 0.7 μm.

The magnetic head used in examining the media was of the type shown in FIG. 2 and having a gap distance a of 0.25 μm and a track width of 20 μm. The core halves 21, 22 were formed of ferrite, gap-defining edge portions 31, 32 were amorphous layers of Co 0.8/Ni 0.1/Zr 0.1 (atomic ratio percent) formed by sputtering to a thickness of 3 μm, and the gap filler was glass. For the head of this size, the minimum protrusion distribution density $10^5/a^2$ is calculated to be $1.6 \times 10^6$.

Protrusion Observation

Tape surface was observed under a scanning electron microscope (SEM) and a transmissive electron microscope (TEM).

Still Life

Signals were recorded in tape at 5 MHz and then reproduced in still mode. The still life is the lapse of time from the start of still mode reproduction until the reproduced output drops to 80% of the initial level.

Surface State at the End of a Durability Test

A tape was repeatedly moved on a commercially available video tape recorder. After 50 passes, the tape surface, that is, magnetic layer surface was observed under an optical microscope. Symbols used in Table 1 have the following meaning.

⊙: no flaw
○: flaw marks on less than 20% of the head traversing area.
Δ: flaw marks on more than 20% of the head traversing area.
X: magnetic layer peeled off.

Auger spectroscopy revealed that the magnetic layers formed in this example were covered with an oxide coating as thick as 100 to 200 Å.

Although colloidal silica was used as inorganic submicron particles in this example, it was found that similar results were obtained when the colloidal silica was replaced by other particulate materials, for example, alumina sol, titanium black, zirconia, and various hydrosols.

For the measurement of sample No. 15, a ferrite head having the same size as mentioned above was used.

TABLE 1

| Sample No. | Substrate treatment | Protrusion Height, Å | Protrusion Density,/mm² | Head | Still life, min. | Surface state |
|---|---|---|---|---|---|---|
| 1 | 100 kHz plasma (O₂ 25%) | 50 | 5 × 10⁶ | amorphous | >120 | ⊙ |
| 2 | 100 kHz plasma (O₂ 25%) | 50 | 1 × 10⁸ | amorphous | >120 | ⊙ |
| 3 | 100 kHz plasma (O₂ 25%) | 100 | 5 × 10⁶ | amorphous | >120 | ⊙ |
| 4 | 100 kHz plasma (O₂ 25%) | 100 | 5 × 10⁸ | amorphous | >120 | ⊙ |
| 5 | 100 kHz plasma (O₂ 25%) | 200 | 5 × 10⁶ | amorphous | >120 | ⊙ |
| 6 | 100 kHz plasma (O₂ 25%) | 200 | 5 × 10⁸ | amorphous | >120 | ⊙ |
| 7 | 100 kHz plasma (O₂ 25%) | 300 | 5 × 10⁶ | amorphous | >120 | ⊚ |
| 8* | 100 kHz plasma (O₂ 25%) | 100 | 5 × 10⁵ | amorphous | 70 | X |
| 9* | 100 kHz plasma (O₂ 25%) | 1000 | 4 × 10⁶ | amorphous | 75 | Δ |
| 10* | 100 kHz plasma (O₂ 25%) | — | — | amorphous | 80 | X |
| 11 | 100 kHz plasma (Ar 100%) | 100 | 5 × 10⁶ | amorphous | 70 | Δ |
| 12 | 100 kHz plasma (N₂ 100%) | 100 | 5 × 10⁶ | amorphous | 75 | Δ |
| 13* | — | 100 | 5 × 10⁵ | amorphous | 10 | X |
| 14* | — | — | — | amorphous | 5 | X |
| 15 | 100 kHz plasma (O₂ 100%) | 100 | 5 × 10⁸ | ferrite | 80 | Δ |

*Comparative Examples

The data in Table 1 proves the effectiveness of the present invention.

To examine how the surfacae of substrates was modified by plasma treatment, the contact angle of plasma-treated polyester films was measured. It was found that when the oxygen content of the atmosphere exceeds 5% by volume in the plasma treatment at frequencies of 10 to 200 kHz, functional groups are formed to a great extent such as to reduce the contact angle, providing a more wettable surface. In addition, the plasma treatment functions to clean the film surface to remove a weak boundary layer (WBL). These effects are reponsible to significant improvements in bond strength and still life.

Along with the cleaninig effect by the plasma treatment, improved wettability resulting from a substantially reduced contact angle of the substrate surface contributes to an improvement in bond strength of the magnetic layer to the substrate, eventually resulting in an extended still life.

EXAMPLE 2

The procedure of Example 1 was repeated. Protrusions having a height of 100 Å. A were distributed at a density of 2×10⁸/mm². The plasma frequency and oxygen content were varied over a wide range. The resulting samples were measured for still life. The magnetic layer and the head were the same as in Example 1.

Figure 4:
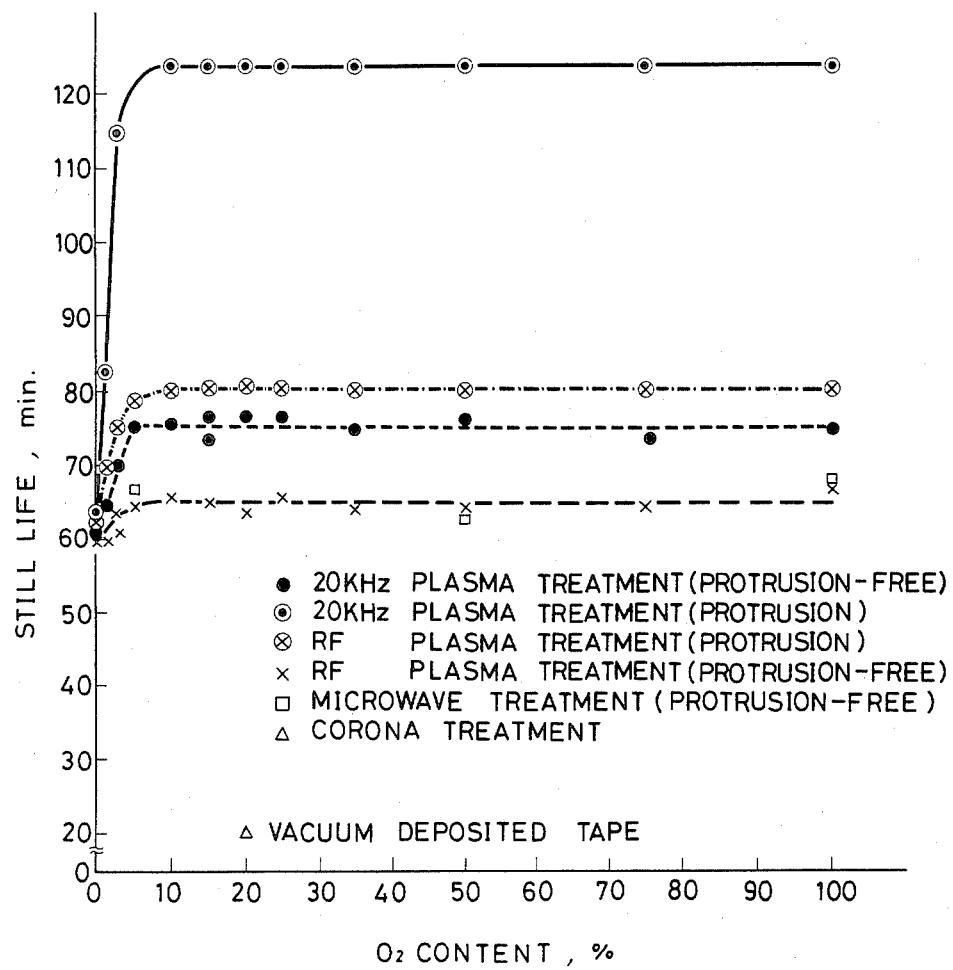
FIG. 4 is a diagram showing the still life of magnetic tapes as a function of oxygen content in the treating gas, the magnetic tapes having substrates treated by the method of the present invention and by prior art techniques.
Figure 5:
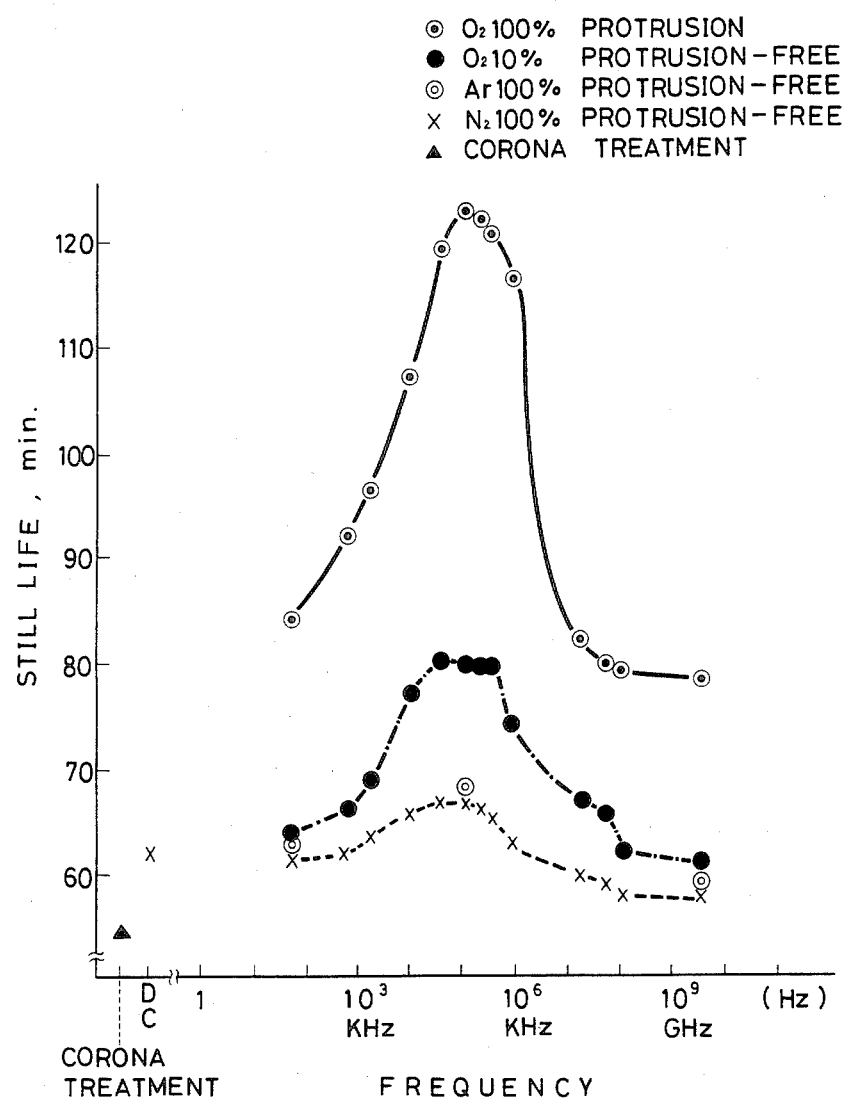
FIG. 5 is a diagram showing the still life of magnetic tapes as a function of plasma frequencies.

The results are plotted in FIGS. 4 and 5. FIG. 4 illustrates the still life of samples as a function of the oxygen content of the treating atmosphere in various plasma treatments. Samples having substrates corona and microwave treated are also plotted. It is evident that the plasma treatment of substrates at a frequency of 20 kHz is outstandingly effective in extending the still life of magnetic tape. Plasma treatment in an atmosphere containing at least 5% by volume of oxygen is most effective.

FIG. 5 illustrates the still life of samples as a function of the frequency of various treatments. It is evident that the plasma treatment in the frequency range of 10 to 200 kHz is outstandingly effective.

What is claimed is:

1. A magnetic recording medium comprising
   a flexible substrate having opposed major surfaces, and
   a ferromagnetic metal thin film layer on one surface of the substrate primarily comprisnig cobalt, the magnetic recording medium being used in combination with a magnetic head having a gap, characterized in that
   said substrate is plasma treated at a frequency of 10 KHz to 200 KHz,
   said metal thin film layer contains oxygen, and
   the medium has protrusions on its surface at an average density of at least $10^5/a^2$ per square millimeter of the surface, the protrusions having a height of 30 to 300 Å, where a is the distance of the magnetic head gap and is 0.1 to 0.5 μm.

2. A magnetic recording medium according to claim 1 wherein the plasma treatment is carried out in a treating gas containing oxygen.

3. A magnetic recording medium according to claim 2 wherein the treating gas comprises 5 to 100% by volume of oxygen.

4. A magnetic recording medium according to claim 1 wherein submicron particles having a particle size of 30 to 300 Å are placed on the substrate prior to the plasma treatment and the ferromagnetic metal thin film layer is formed on the particle-bearing, plasma treated surface of the substrate.

5. A magnetic recording medium according to claim 1 wherein the ferromagnetic metal thin film layer has a layer of ferromagnetic metal oxide on the surface thereof.

6. A magnetic recording medium according to claim 1 wherein the protrusins are distributed at an average density in the range of $2 \times 10^6/a^2$ to $1 \times 10^9/a^2$ per square millimeter.

7. A magnetic recording medium according to claim 1 wherein the ferromagnetic metal thin film layer consists essentially of Co and O, or Co, O and at least one element selected from Ni and Cr.

8. A magnetic recording medium according to claim 7 wherein the ferromagnetic metal thin film layer has an atomic ratio of O/Co or O/(Co+Ni) of not less than 0.5.

9. A method for conducting recording/reproducing operation on a magnetic recording medium comprising a flexible substrate having opposed major surfaces, and a ferromagnetic metal thin film layer on one surface of the substrate principally comprising cobalt, by passing the medium across a magnetic head having a gap, characterized in that said ferromagnetic metla thin film layer contains oxygen and is formed on the flexible substrate which has been plasma treated at a frequency in the range of 10 to 200 kilohertz, and the medium has in average at least $10^5/a^2$ protrusions per square millimeter of the surface, the protrusions having a height of 30 to 300 Å, where a is the distance of the magnetic head gap and is 0.1 to 0.5 μm.

10. A magnetic recording/reproducing method according to claim 9 wherein at least an edge portion of the magnetic head including the gap is formed of a ferromagnetic metal material.

11. A magnetic recording/reproducing method according to claim 10 wherein the ferromagnetic metal material is a magnetic amorphous cobalt base alloy.

* * * * *